United States Patent
Uchida et al.

(10) Patent No.: US 8,548,664 B2
(45) Date of Patent: Oct. 1, 2013

(54) AUTONOMIC TRAVELING APPARATUS FOR A VEHICLE

(75) Inventors: Takayuki Uchida, Yokohama (JP); Yukihiro Kawamata, Hitachi (JP); Katsuaki Tanaka, Hitachinaka (JP); Mikio Bando, Mito (JP)

(73) Assignee: Hitachi, Ltd., Tokyo (JP)

( * ) Notice: Subject to any disclaimer, the term of this patent is extended or adjusted under 35 U.S.C. 154(b) by 304 days.

(21) Appl. No.: 12/942,682

(22) Filed: Nov. 9, 2010

(65) Prior Publication Data

US 2011/0118900 A1    May 19, 2011

(30) Foreign Application Priority Data

Nov. 13, 2009   (JP) .................................. 2009-259396

(51) Int. Cl.
*G06F 17/00* (2006.01)
*G08G 1/16* (2006.01)
*G08G 1/097* (2006.01)

(52) U.S. Cl.
USPC ................. 701/23; 701/28; 701/50; 701/117; 701/411; 340/905

(58) Field of Classification Search
USPC ............... 701/1, 2, 23, 24, 25, 26, 28, 36, 50, 701/117, 400, 408, 409, 410, 411, 414, 420, 701/422, 423, 466, 467, 468, 514, 532, 300, 701/301; 340/901, 905, 988, 989, 995.1
See application file for complete search history.

(56) References Cited

U.S. PATENT DOCUMENTS

| 6,292,725 | B1 | 9/2001 | Kageyama et al. | |
|---|---|---|---|---|
| 6,405,132 | B1* | 6/2002 | Breed et al. | 701/301 |
| 6,941,201 | B2 | 9/2005 | Sudou | |
| 2004/0143375 | A1 | 7/2004 | Sudou | |
| 2005/0240330 | A1* | 10/2005 | Heinrichs-Bartscher | 701/48 |
| 2007/0293996 | A1* | 12/2007 | Mori et al. | 701/23 |

FOREIGN PATENT DOCUMENTS

JP    2004-157934 A    6/2004

* cited by examiner

*Primary Examiner* — Thomas Tarcza
*Assistant Examiner* — Edward Pipala
(74) *Attorney, Agent, or Firm* — Crowell & Moring LLP

(57) ABSTRACT

In an autonomic traveling apparatus for a vehicle, vehicles usually travel an independent travel lane and when there are two approaching vehicles on the independent travel lane, they switch to pass-by lanes to pass by each other. To do this switching operation effectively, respective vehicles check and obtain road conditions around them while they are traveling and the obtained road conditions are transmitted to and collected by a travel administration center so that the road conditions at various points along the lanes can be obtained from the travel administration center. Accordingly, when the autonomic traveling trucks approaching each other and supposed to pass by each other, switch to the associated pass-by lanes, they change travel lanes avoiding the point of bad road condition on the basis of the road conditions sent from the travel administration center.

6 Claims, 7 Drawing Sheets

FIG.2

| 200 | 205 | 210 | T4 |
|---|---|---|---|
| VEHICLE ID | ID OF LINK BEING TRAVELED | VEHICLE POSITION | |
| 1 | L1 | (X1, Y1) | |
| 2 | S3 | (X2, Y2) | |
| 3 | S4 | (X3, Y3) | |
| 4 | P1 | (X4, Y4) | |
| 5 | L4 | (X5, Y5) | |

VEHICLE ADMINISTRATION TABLE

| 250 | 255 | T5 |
|---|---|---|
| ID OF LINK BEING TRAVELED | VEHICLE POSITION | |
| L1 | (X1, Y1) | |

VEHICLE POSITION TABLE

FIG.4
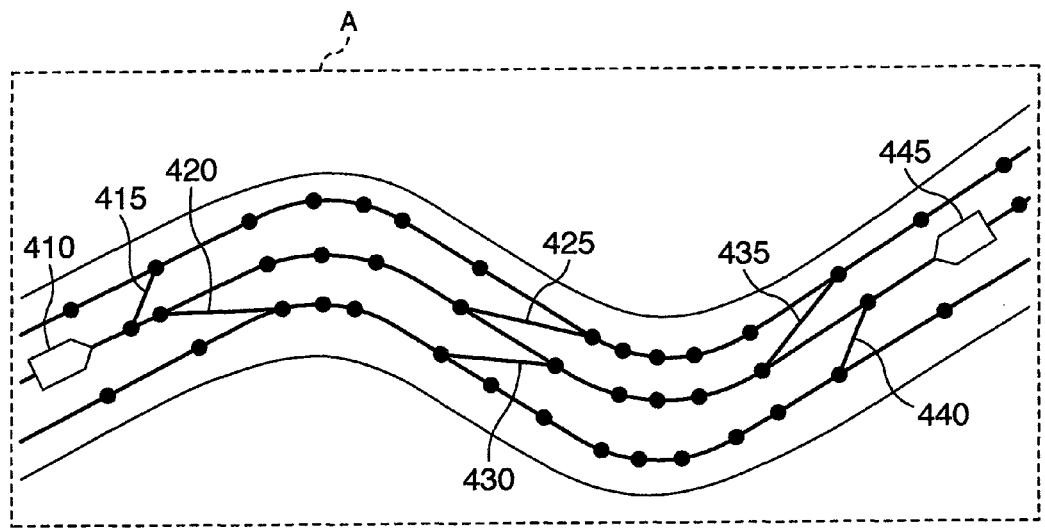
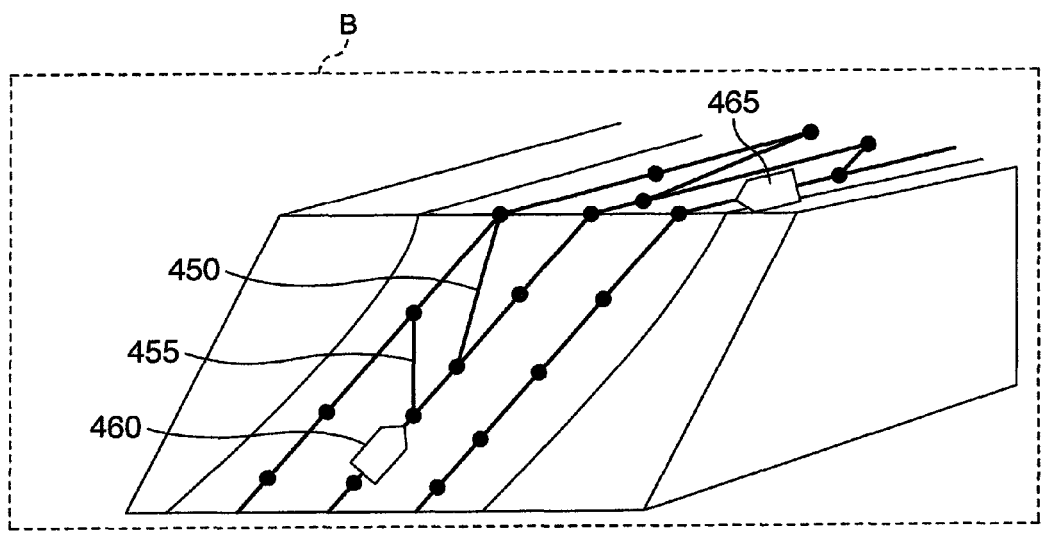

FIG.5

| LINK ID | START POINT COORDINATES | END POINT COORDINATES | LINK ID OF CROSSOVER LANE |
|---|---|---|---|
| L1 | (A1, B1) | (C1, D1) | S1 |
| ⋮ | ⋮ | ⋮ | ⋮ |
| Ln | (Am, Bm) | (Cm, Dm) | Sn |
| Ln + 1 | (Am + 1, Bm + 1) | (Cm + 1, Dm + 1) | Sn + 1 |
| ⋮ | ⋮ | ⋮ | ⋮ |
| Lk | (Ah + 1, Bh + 1) | (Ch + 1, Dh + 1) | Sk |

T1 INDEPENDENT TRAVEL LANE TABLE

Columns: 500, 505, 510, 515

| LINK ID OF CROSSOVER LANE | START POINT COORDINATES OF CROSSOVER LANE | END POINT COORDINATES OF CROSSOVER LANE | ROAD CONDITION |
|---|---|---|---|
| S1 | (I1, J1) | (K1, O1) | BAD |
| ⋮ | ⋮ | ⋮ | ⋮ |
| Sn | (Im, Jm) | (Km, Om) | GOOD |
| Sn + 1 | (Im + 1, Jm + 1) | (Km + 1, Om + 1) | BAD |
| ⋮ | ⋮ | ⋮ | ⋮ |
| Sk | (Ih + 1, Jh + 1) | (Kh + 1, Oh + 1) | TRAVELABLE |

T2 CROSSOVER LANE TABLE

Columns: 520, 525, 530, 535

| LINK ID OF CROSSOVER LANE | LINK ID OF PASS-BY LANE | START POINT COORDINATES OF LANE LINK | END POINT COORDINATES OF LANE LINK |
|---|---|---|---|
| S1 | P1 | (E1, F1) | (G1, H1) |
| ⋮ | ⋮ | ⋮ | ⋮ |
| Sn | Pn | (Em, Fm) | (Gm, Hm) |
| Sn + 1 | Pn + 1 | (Em + 1, Fm + 1) | (Gm + 1, Hm + 1) |
| ⋮ | ⋮ | ⋮ | ⋮ |
| Sk | Pk | (Eh + 1, Fh + 1) | (Gh + 1, Hh + 1) |

T3 PASS-BY LANE TABLE

Columns: 540, 545, 550, 555

| LINK ID OF DESTINATION | START POINT COORDINATES OF LINK | END POINT COORDINATES OF LINK |
|---|---|---|
| L100 | (A100, B100) | (C100, D100) |

T6 DESTINATION TABLE

AUTONOMIC TRAVELING APPARATUS FOR A VEHICLE

BACKGROUND OF THE INVENTION

This invention relates to an apparatus for causing vehicles to travel autonomously, which can be applied to the technical field of civil-engineering machinery where unattended transport vehicles hauling loads of, for example, mining travel along fixed lanes.

At a mining site is generally required a technique for causing an unattended machine to perform the mining operations for the purpose of enhancing safety and reducing mining cost. In case of strip mining wherein minerals near the earth's surface are collected by constructing the spiral lane downward instead of digging mining shafts and tunnels, excavation activity takes place at the deepest point and excavated earth and mined minerals must be hauled out of the mining site. Huge vehicles having an enormous load capacity such as giant dump trucks can be used for the transporting purpose. Since the amount of transported load per unit time directly affects the degree of progress in mining operation, the high-speed transportation of load is required.

In order to haul a great amount of dirt and minerals out of the mining site with high efficiency, plural transport vehicles must reciprocate along fixed transport roads so many times. Consequently, the probability that vehicles traveling the lane toward the mining site may collide with vehicles traveling the lane back from the mining site, will increase. One way of lowering the risk of collision while the vehicles are traveling at high speeds is to make the widths of the transport lanes large. The widening of the transport lanes, however, gives rise to a problem that the mining area is accordingly decreased.

JP-A-2004-157934 and the U.S. Pat. No. 6,941,201 disclose the method for solving this problem. These documents disclose an invention wherein a road is constructed whose width is wide enough for two vehicles to pass by each other safely when they travel the lanes near the road shoulders at reduced speeds, and wherein a vehicle traveling alone without any other vehicle around itself can travel the lane located in the middle of the road, two vehicles approaching toward and supposed to pass by, each other switch to the side lanes near the shoulders of the road with decelerating speeds, and the vehicles after having passed by each other return to the central lane and travel at higher speeds.

The U.S. Pat. No. 6,292,725 discloses an invention wherein two approaching vehicles pass by each other at high speeds on the portion of the road having so sufficient a width that the vehicles can pass by each other safely, and the collision of the two approaching vehicles can be avoided by causing one vehicle to pass by the other while the other vehicle is at rest, where the road becomes narrow.

SUMMARY OF THE INVENTION

According to JP-A-2004-157934, U.S. Pat. No. 6,941,201 and the U.S. Pat. No. 6,292,725, however, the vehicles are caused to enter the pass-by lanes depending solely on the approach of the two vehicles and the surface condition of the road is not taken into consideration. The road in the mining site is not paved and therefore the surface condition is easily deteriorated depending on weather or as vehicles go back and forth so many times. Also, the load amount of a dump truck drastically changes between the travel toward the mining site and the travel back from the mining site. Further, there is a risk of a turnover when a truck attempts to enter the pass-by lane by turning the steering wheel, leading to a serious accident. Moreover, such a turnover might involve an approaching vehicle in the accident, multiplying the damage of the accident to an extreme extent.

This invention provides the following solution to the problems described above.

According to an autonomic vehicle using an autonomic traveling apparatus as an embodiment of this invention, the vehicle change its course from the central lane of a road where high-speed travel is possible to the road side pass-by lanes by using a crossover lane whose road surface condition notified by the travel administration center is good, at decelerating speed, so that an accident such as a turnover can be avoided since the turning of the steering wheel takes place at the safe spot where the road surface condition is good.

According to an autonomic vehicle using an autonomic traveling apparatus as another embodiment of this invention, the vehicle travels the central lane of the road at high speeds while there is no other vehicle around itself; the vehicle enters the road side lane and travels at lower speeds only when it must pass by another vehicle approaching it; and therefore the time for decelerated travel is shortened while the time for accelerated travel is prolonged, so that the efficiency of hauling mining dirt can be improved.

According to an autonomic vehicle using an autonomic traveling apparatus as still another embodiment of this invention, the travel administration center of the autonomic traveling apparatus counts the number of crossover lanes existing between two vehicles approaching each other, whose surface conditions are found good without any obstacle, whose information is stored in the lane information storage in the travel administration center, and through which the vehicle changes its course from the central lane of a road to the road side lanes for passing-by; and notifies the approaching vehicles that they should enter the pass-by lanes via the crossover lane when the counted number is equal to or less than a predetermined value chosen on the basis of a safety standard, so that the steering wheel can be turned at the safe spot where the road surface condition is good free of obstacles. Therefore, even though there are some obstacles on some crossover lanes, the vehicles can avoid traveling the dangerous crossover lanes so that those bad crossover lanes cannot adversely affect the travel of the vehicles.

According to an autonomic traveling apparatus for a vehicle according to this invention, vehicles can travel safely at high speeds in such an environment as a mining site where plural vehicles travel back and forth and one vehicle passes by another so many times.

Other objects, features and advantages of the invention will become apparent from the following description of the embodiments of the invention taken in conjunction with the accompanying drawings.

BRIEF DESCRIPTION OF THE DRAWINGS

FIG. 2 shows the structure of data stored in the vehicle position storage used in the autonomic traveling apparatus according to this invention;

FIG. 4 illustrates the lanes of a bent or a sloping road and the travel directions of two vehicles approaching each other along the bent or sloping road;

FIG. 5 shows the structure of data stored in the lane information storage of the travel administration center;

DESCRIPTION OF THE EMBODIMENTS

Figure 1:
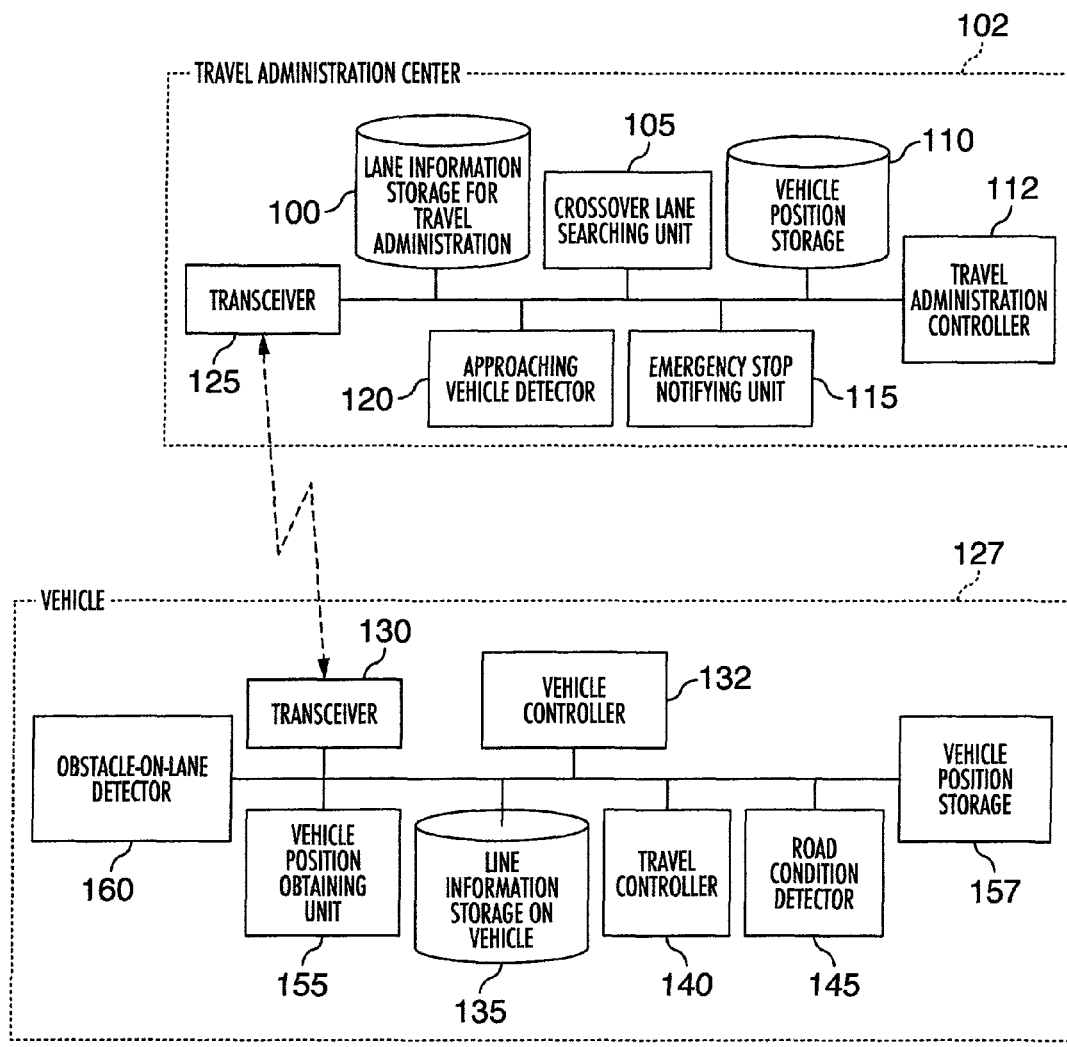
FIG. 1 shows in block diagram the entire system of an autonomic traveling apparatus according to this invention.

Now, an autonomous traveling apparatus as embodiments of this invention will be described below in reference to the attached drawings. FIG. 1 shows in block diagram the entire structure of an autonomic traveling apparatus according to this invention. Each vehicle 127 is so controlled as to follow one of respective lanes in accordance with the lane information defined previously in a travel administration center 102. The lane information is stored in a lane information storage 100 for travel administration.

Lanes include an independent travel lane which is located nearly at the center of a travel road and along which vehicles travel independently; pass-by lanes on which two vehicles approaching each other travel to pass by each other; and crossover lanes via which a vehicle traveling an independent travel lane can switch to a pass-by lane or a vehicle having once entered a pass-by lane can return to an independent travel lane after passing-by. As illustrated in A of FIG. 3, individual vehicles 455 and 435 are traveling on the independent travel lane 425 in the opposite direction mutually. That is, the vehicle 435 is moving in the direction from the upper side to the bottom side of the drawing, while the vehicle 455 is moving in the direction from the bottom side to the upper side of the drawing. When the distance between the vehicles 435 and 455 becomes narrow, the vehicles 435 and 455 enter into the respective crossover lanes 420 and 450 as illustrated in B of FIG. 3, and then move into and travel on the respective pass-by lanes 410 and 470 as shown in C of FIG. 3 to ward off a collision. As shown in FIG. 5, the lane information is stored in the form of data tables in the lane information storage 100, such as an independent travel lane table T1 corresponding to an independent travel lane, a crossover lane table T2 corresponding to crossover lanes and a pass-by lane table T3 corresponding to pass-by lanes. Each lane is defined as a concatenation of links. As a row in each of the independent travel lane table T1, the crossover lane table T2 and the pass-by lane table T3 is stored various pieces of information on one of the links constituting the associated lane. Here, a link of the lane is meant to be a line segment of constant length obtained by dividing the lane according to a certain rule, or a segment connecting one inflection point to the next if the lane is curving.

Figure 3:
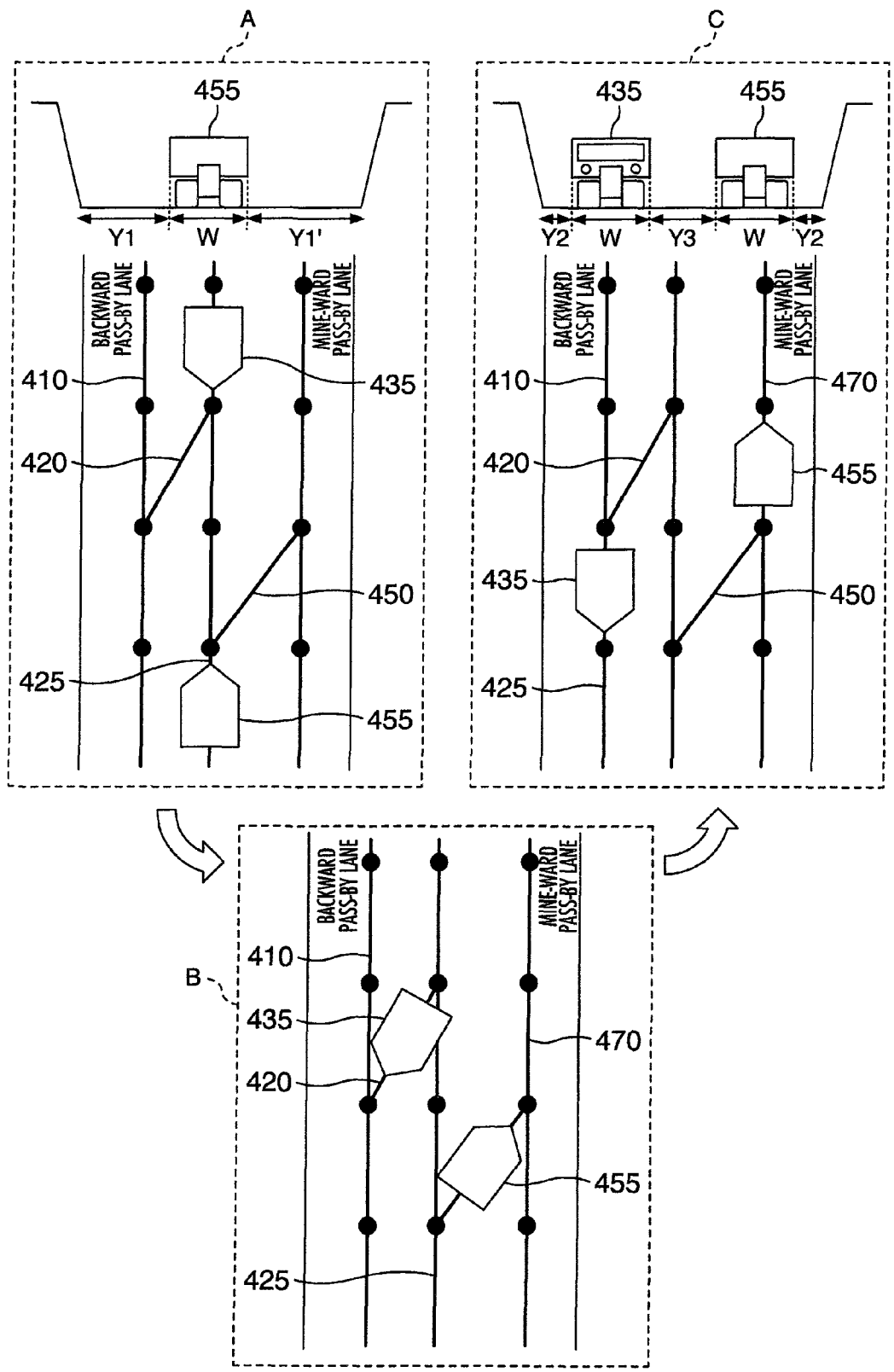
FIG. 3 illustrates the lanes of a road and the travel directions of two vehicles approaching each other along the road.

The independent travel lane table T1 contains the information on such a lane link as the link 425 of an independent travel lane as shown in A of FIG. 3, that is defined to be at the center of a travel road along which a vehicle 455 or a vehicle 435 will travel. The information on the independent travel lane stored in the independent travel lane table T1 consists of at least link IDs 500 capable of discriminating among the links of the lane and the coordinate points 505 and 510 representing the start and end points of a link, the coordinate point being the paired combination of longitude and latitude as on a map. Further, for example, as shown in A of FIG. 3 if there is a crossover lane 450 that is branching out from the link 425 of the independent travel lane, the information to be stored in the lane information storage will be the combination of the ID of the link 425 of the independent travel lane and the link ID 515 of the crossover lane 450 associated with the link 425 of the independent travel lane.

Y1 and Y1' represent distance which determine the positions of the independent travel lane 425 with respect to the pass-by lanes 410 and 470 for securing safe passing of the vehicle. For example, in a location where one side of the lane hugs a cliff, sufficient width of the distance for keeping safe traveling of the vehicles is required. In that case, the distance for the lane close to edge of the cliff is set wider in consideration with braking performance of the vehicles in emergency operation and the widths W of the vehicles 410 and 455.

It is to be noted that in anticipation of avoiding a traffic accident, crossover lanes are constructed only in such points of the independent travel lane as where a vehicle can safely change its course from an independent travel lane to a pass-by lane. In other words, crossover lanes are not constructed in that portion of the lane which has a sharp bend, i.e. short radius of curvature, as shown in A of FIG. 4 for preventing the vehicles 410 and 445 from traveling the sharp bend portion of the lane, nor in that portion of the lane which has a declivity as shown in B of FIG. 4 for preventing the vehicles 460 and 465 from traveling the decline of the lane. Those crossover lanes 415, 420, 425, 430, 435, 440, 450 and 455 are constructed in such a manner as described just above that the vehicle can safely change its course from the independent travel lane to the pass-by lane or vice versa only before or after those sharply bent portions or steeply descending portions.

In order for two vehicles traveling toward each other along an independent travel lane to avoid a head-on, collision and pass by each other, the link information of the pass-by lanes constructed in parallel with the independent travel lane is stored in the pass-by lane table T3. The information stored in the pass-by lane table T3 consists of link IDs 545 for identifying the links of the pass-by lanes, link IDs 540 of crossover lanes leading to the pass-by lanes, and the link start and end coordinate points corresponding to the starts and ends of the links of the pass-by lanes, each coordinate point being the paired combination of longitude and latitude as on a map.

As shown in C of FIG. 3, pass-by lanes are distanced from the road shoulders by a preset distance of Y2 in order for the vehicles 435 and 455 traveling toward each other to be able to safely pass by each other, and also the pass-by lanes are distanced from each other by a distance of Y3. The weight of a giant transporter vehicle varies between about 100 t and 200 t depending on whether it is traveling toward the mining site without load or back from the mining site with full of load. The weight of a transporter vehicle may vary to a great extent between about 100 t and 200 t depending on whether it is traveling toward the mining site without load or back from the mining site with full of load. As a result, a loaded vehicle back from a mining site experiences larger centrifugal force when it changes its course of traveling. It is therefore necessary to make the radius of curvature of the bent crossover lane large enough to avoid the danger of turnover when the vehicle is changing its course. In order to suppress the centrifugal force exerted on a heavily loaded vehicle back from the mining site, the backward and mine-ward pass-by lanes are so constructed that the distance between the former and the independent travel lane is smaller than the distance between the latter and the independent travel lane, so that the radius of curvature along the path through which the vehicle enters the crossover lane does not become smaller than a preset value. In this way, the safe transportation of mined load can be realized in consideration of the weight difference between a vehicle traveling without load toward the mining site and the same vehicle full of mined load traveling back from the mining site, characteristic of the transport operation at the mining site.

The independent travel lane is defined in two ways: the start point coordinates and the end point coordinates of the link used as a segment of the mine-ward lane traveled by a vehicle heading toward the mining site are exchanged with each other when it is used as a segment of the backward lane traveled by a vehicle returning from the mining site. The decision on whether a vehicle is traveling on the mine-ward lane or the backward lane may be made by checking the IDs of the links of the lane successively, or by determining which of the two nodes of a link the vehicle have passed first. The pass-by lanes are constructed in such areas as described above that two vehicles can safely pass by each other. Each of the pass-by lanes is of one way traffic. All the crossover lanes are so constructed that when a vehicle changes its course from an independent travel lane to a pass-by lane, the vehicle always leaves the independent travel lane at the start point of the pass-by range and that when the vehicle changes its course from a pass-by lane to an independent travel lane, it always leaves the pass-by lane at the end point of the pass-by range. In this way, two vehicles traveling toward each other along an independent travel lane change their course onto the pass-by lanes on both the sides of the independent travel lane at their respective start points of the pass-by range and thereafter they are not allowed to return to the independent travel lane at any intermediate point of the pass-by range, but allowed to return only after the passing-by has been completed at their respective end points of the pass-by range.

The crossover lane table T2 stores the information on crossover links which are to be traveled by vehicles when they change their course from an independent travel lane to pass-by lanes or from pass-by lanes to an independent travel lane. The information stored in the crossover lane table T2 includes link IDs 520 for identifying the links corresponding to the crossover lanes, link start and end coordinate points 525 and 530 respectively representing the latitudes and longitudes at the start and end points of the links corresponding to the crossover lanes, and the road conditions 535 of the crossover links.

A travel administration controller 112 in the travel administration center 102 controls all the processes executed by a crossover lane searcher 105, an emergency stop notifying unit 115, an approaching vehicle detector 120 and a transceiver 125.

A vehicle position storage 110 stores a vehicle administration table T4 including the IDs of the links which respective vehicles are currently traveling, and the coordinate points of the vehicles. FIG. 2 shows an example of the vehicle administration table T4. Each row of the vehicle administration table T4 contains the ID 200 of a vehicle under administration, the ID 205 of the link being traveled by the vehicle, and the position 210 of the vehicle represented by a coordinate point consisting of the associated latitude and longitude.

The crossover lane searcher 105 always searches the IDs of all the crossover lanes existing between two vehicles traveling an independent travel lane toward each other, and transmits via the transceiver 125 the IDs to the vehicles which are to pass by each other in the future. The crossover lanes existing between the approaching vehicles, in the example shown in FIG. 4A, are supposed to be crossover lanes 415, 420, 425, 430, 435 and 440.

The emergency stop notifying unit 115 sends out emergency stop commands to the vehicles supposed to pass by each other in order to prevent the vehicles from colliding with each other in the case where there is an obstacle in a crossover lane which disables the use of the crossover lane and the distance between the approaching vehicles becomes equal to or less than the sum of the stopping distances of the respective vehicles before they enter the pass-by lanes.

The approaching vehicle detector 120 counts the number of the link IDs of the crossover lanes existing between two approaching vehicles traveling the same independent travel lane and supposed to pass by it in the near future, and notifies, via the transceiver 125, the approaching vehicles of the command that they need to enter the associated pass-by lanes, if the number of the link IDs is equal to or less than a value predetermined according to the safety standard.

If there is no obstacle on any one of the crossover lanes, the existence of only two crossover lanes between the two approaching vehicles supposed to pass by each other can secure their safe passing-by. However, in actuality, a possibility may arise that one or both of the vehicles cannot enter the crossover lanes due to road constructors moving around or a vehicle at fault near, the pass-by area. In anticipation of such an accidental case where one or more crossover lanes cannot be entered due to obstacles, the approaching vehicle detector 120 notifies the approaching vehicles of the command that they need to switch to the suitable pass-by lanes while the number of the crossover lanes between the two vehicles approaching each other is still more than two.

The transceiver 125 of the travel administration center 102 communicates with the transceiver 130 of a traveling vehicle 127 so that the information on lanes is communicated between the travel administration center 102 and the traveling vehicle 127.

On the other hand, the vehicle controller 132 of the vehicle 127 controls all the processes executed by the transceiver 130, a travel controller 140, a road condition detector 145, a vehicle position obtaining unit 155, a vehicle position storage 157, and an obstacle-on-lane detector 160.

A vehicle-borne lane information storage 135 stores in advance an independent travel lane table T1, a crossover lane table T2 and a pass-by lane table T3 which are similar to those stored in the lane information storage 100 of the travel administration center 102, in order to control the safe passing-by of two approaching vehicles in response to the notification sent from the travel administration center 102. Then, the information on the road conditions of the crossover lanes sent from the travel administration center 102 at appropriate times is stored as the road conditions of the interested crossover lanes in the road condition column 535 of the crossover lane table T2. Further, the vehicle-borne lane information storage 135 stores a destination table T6 containing that ID of the link of the lane which is located at the deepest point of the mining site where actual mining operations are performed, and the start and end points of the link represented by the corresponding start and end coordinate points consisting of latitudes and longitudes.

The vehicle position obtaining unit 155 specifies the ID of the link of the lane being traveled by the vehicle having the vehicle position obtaining unit 155 installed thereon. Then, the vehicle position obtaining unit 155 measures the coordinates of the vehicle position by using, for example, a GPS device, and specifies the ID of the link corresponding to that link of the lane which is nearest to the coordinate point of the current vehicle position, the coordinates being selected from among the link start coordinates or link end coordinates stored in the independent travel lane table T1, the crossover lane table T2 and the pass-by lane table T3 of the vehicle-borne lane information storage 135, as the link ID of the lane being currently traveled by the vehicle with the vehicle position obtaining unit 155 installed thereon.

The travel controller 140 is a controller that causes the vehicle to travel toward the coordinates of the end point of the link of the lane, the vehicle is currently on the link and traveling the lane. The vehicle may be driven by an electric motor or an internal combustion engine.

The road condition detector 145 checks the road conditions of the crossover lanes near the traveling vehicle and determines whether or not the road conditions are good enough for the vehicle to safely enter them. In order to observe the road condition of crossover lanes, a video camera may be used to determine the road condition through image recognition, or any of such indirect methods may be employed as measuring the ratio of the actual vehicle speed to the actual wheel rotational speed, an analyzing the frictional sound generated between the tires and the road surface. The indirect methods can indicate whether or not the road surface is muddy or sandy, that is, whether the road is not suitable for travel due to an extreme decrease in friction or whether the road can be traveled though its frictional coefficient is small. The result of the determination is then stored in the road condition column 535 in the crossover lane table T2.

The vehicle position storage 157 stores the vehicle position obtained by the vehicle position obtaining unit 155 and represented by the corresponding coordinate point consisting of latitude and longitude, and the ID of the link of the lane being currently traveled by the vehicle in the vehicle position column 255 and the link ID column 250, respectively, of the vehicle position table T5 shown in FIG. 2.

The obstacle-on-lane detector 160 checks whether or not there is an accidental obstacle such as a maintenance worker moving or a vehicle at fault, on the crossover lane near the traveling vehicle. The method of detecting such an unusual condition may include the use of such a sensor as, for example, a vehicle-borne radar using laser beams or millimeter waves or a stereo camera which can determine whether or not there is an obstacle near the traveling vehicle.

Figure 6:
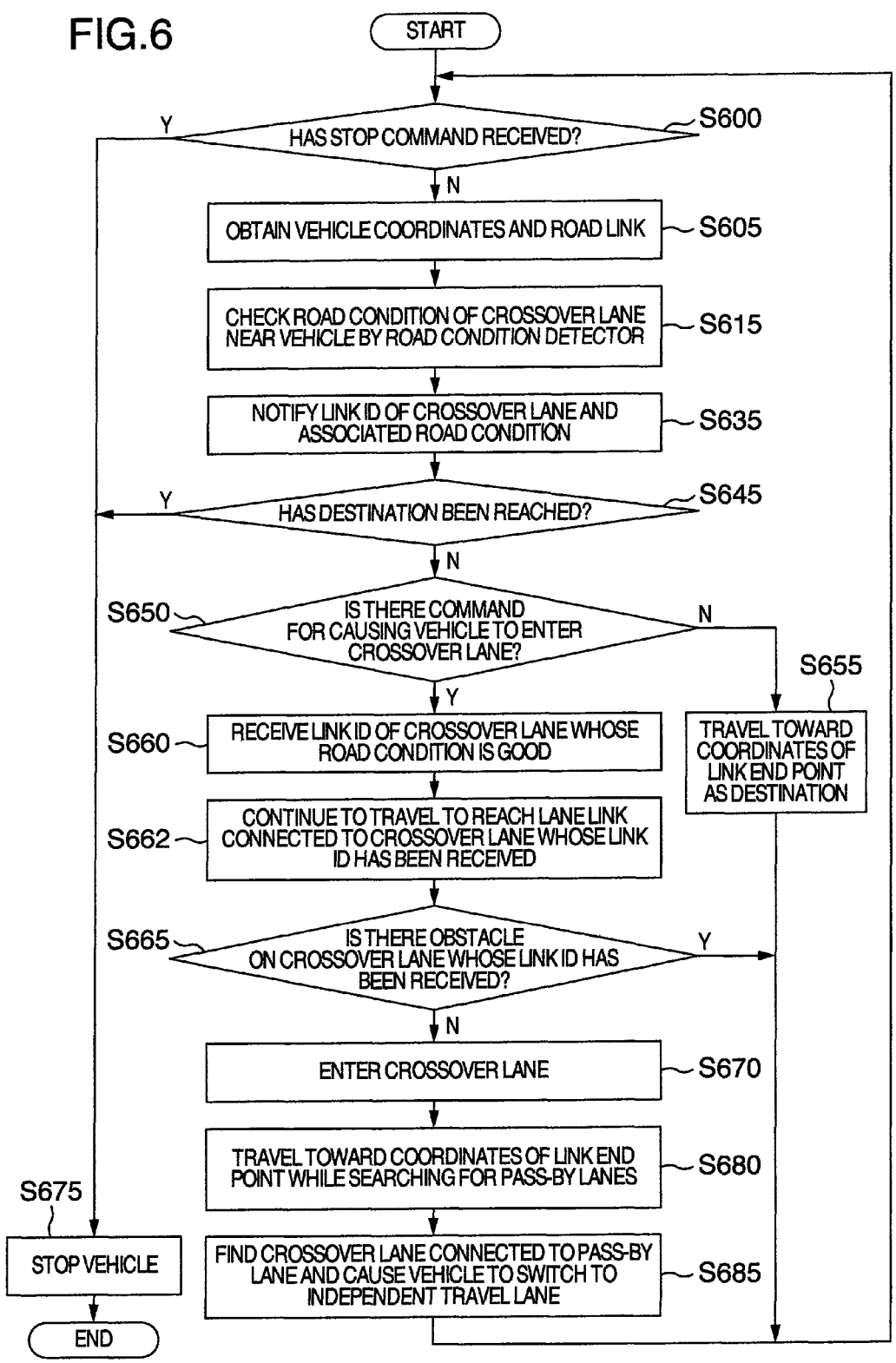
FIG. 6 is the flow chart for a process performed on the side of a traveling vehicle.

Now, the travel control process for the vehicle 127 by the vehicle controller 132 will be described in reference to the flow chart shown in FIG. 6.

The vehicle controller 132 checks whether or not the travel administration center 102 has sent a stop command to a traveling vehicle via the transceiver 130 (S600). If the vehicle has received the stop command, the travel controller 140 puts the traveling vehicle to a halt (S675) and the control finishes. On the other hand, if a stop command has not been received by the vehicle, the process shifts to the step S605.

If the stop command has not been received by the vehicle, the vehicle position obtaining unit 155 obtains the coordinates of the vehicle by means of, for example, a GPS device. The obtained coordinates are then compared with the start and end coordinates of respective links stored in the independent travel lane table T1, the crossover lane table T2 and the pass-by lane table T3 so that the link having the coordinates nearest to the obtained coordinates is specified as the link on which the vehicle currently exist. The ID of the specified link is then obtained from the associated lane table and the required data are stored in the traveled rink ID column 250 and the vehicle position column 255 of the vehicle position table T5 (S605). At this time, the vehicle position and the traveled link ID, after the vehicle ID of the traveling vehicle is attached to them, are notified to the travel administration center 102 via the transceiver 130. Upon reception of the notification, the travel administration center 102 renews the vehicle administration table T4. Here, it is assumed that the link IDs are classified according to the kinds of lanes, that is, the independent travel lane, the crossover lane and the pass-by lane so that the link being currently traveled can be identified as an independent travel lane, a crossover lane or a pass-by lane on the basis of the link IDs.

The road condition detector 145 determines the condition of the road corresponding to the crossover lane in the vicinity of the traveling vehicle (S615), and specifies the crossover lane subjected to the determination, on the basis of the position of the vehicle. When the result of the determination differs from that content of the road condition column 535 of the crossover lane table T2 which corresponds to the previously set road condition of the same crossover lane, the crossover lane table T2 is renewed. Simultaneously, the road condition detector 145 transmits the combination of the link ID of the crossover lane and the result of the determination on the basis of the road condition, that is, whether or not the crossover lane can be traveled by the vehicle, to the travel administration center 102 via the transceiver 130 (S635).

Subsequently, in the step S635, the link ID stored in the vehicle position storage 157 is compared for coincidence with the link ID of the destination stored in the destination table T6. If there is a coincidence between them, it is determined that the destination has been reached. Accordingly, the process flow moves to S675 to stop the travel of the vehicle and the end of the process flow is reached. If there is not a coincidence, it is determined that the destination has not yet been reached. Therefore, the process flow shifts to the step S650 and the process continues.

In the step S650, decision is made on whether or not the travel administration center has sent out the command of causing the traveling vehicle to enter the nearest crossover lane, via the transceiver 130. If the command has been sent out, the step S660 is reached. If the command has not been sent out, the step S655 is reached. Then, that ID 250 of the link being currently traveled which is stored in the vehicle position table T5 of the vehicle position storage 157 is read out. The table containing the lane corresponding to the read link ID is searched. The travel controller 140 causes the vehicle to travel toward the end coordinates of the link whose ID is coincides with the read link ID and that is supposed to be the provisional destination. For example, if the read link ID belongs to the independent travel lane, the link ID column 500 of the independent travel lane table T1 is searched to spot the link ID that is identical with the read link ID. The end coordinates of the spotted link is set as the coordinates of the provisional destination, and the travel controller 140 causes the vehicle to travel until the provisional destination is reached. After this operation, the process flow returns to the step S600.

On the other hand, if decision has been made that the command for the vehicle to enter the nearest crossover lane has been sent out by the travel administration center in the step S650, the vehicle needs to switch to the pass-by lane. Then, in the step S660, the travel controller 140 receives the candidate link ID for the crossover lane whose road condition is good enough to secure safe traveling, from the travel administration center 102. Thereafter, in order for the obstacle-on-lane detector 160 to check whether or not there is an obstacle on the crossover lane whose link ID is identical with the link ID received in the step S660, the travel controller 140 controls the vehicle so that it continues to travel the independent travel lane until the link connected to the interested crossover lane has been reached (S662).

When the link connected to the interested crossover lane has been reached, the obstacle-on-lane detector 160 checks whether or not there is an obstacle on the crossover lane whose link ID was received in the step S660 and whose road condition was regarded good (S655). If there is an obstacle on the crossover lane having the received link ID, the vehicle cannot enter it. Accordingly, the step S600 is reached so that the next crossover lane can be found while the vehicle is traveling.

If no obstacle is found on the crossover lane in the step S655, the travel controller 140 controls the vehicle so that it enters and travel the crossover lane (S670). Then, in order to find that link of the pass-by lane which is connected to the crossover lane being currently traveled, the crossover lane link ID column 540 of the pass-by lane table T3 is searched and the start and end coordinates of the pass-by lane which the vehicle should enter are obtained. Thereafter, the travel controller 140 controls the vehicle so that it travels toward the end coordinates of the crossover lane regarded as a target point after having entered the crossover lane (S680).

When the vehicle starts traveling the pass-by lane, it travels the pass-by lane toward its end link coordinates as a target point, following the step S680. In order for the vehicle to return to the independent travel lane after having passed by an approaching vehicle, the pass-by lane link ID column 545 of the pass-by lane table T3 is searched on the basis of that link ID of the pass-by lane which is being currently traveled so that the link ID 540 of the crossover lane connected to the pass-by lane link being currently traveled can be spotted. If such a crossover lane link ID is not spotted on the basis of the link ID of the pass-by lane being currently traveled, the ID of another crossover lane link is searched in the pass-by lane table T3 on the basis of the next link ID of the pass-by lane. This operation is repeated until the link ID of an available crossover lane has been spotted. If the link ID of the available crossover lane is spotted, the crossover lane link ID column 520 of the crossover lane table T2 is searched to obtain the start and end coordinates of the crossover lane through which the vehicle returns to the independent travel lane. Accordingly, the travel controller 140 controls the vehicle so that it travels the entered crossover lane from the start coordinates to the end coordinates. As a result, the vehicle can return to the independent travel lane (S685). Then, the step S600 is resumed and similar operations are repeated until the final destination has been reached.

Figure 7:
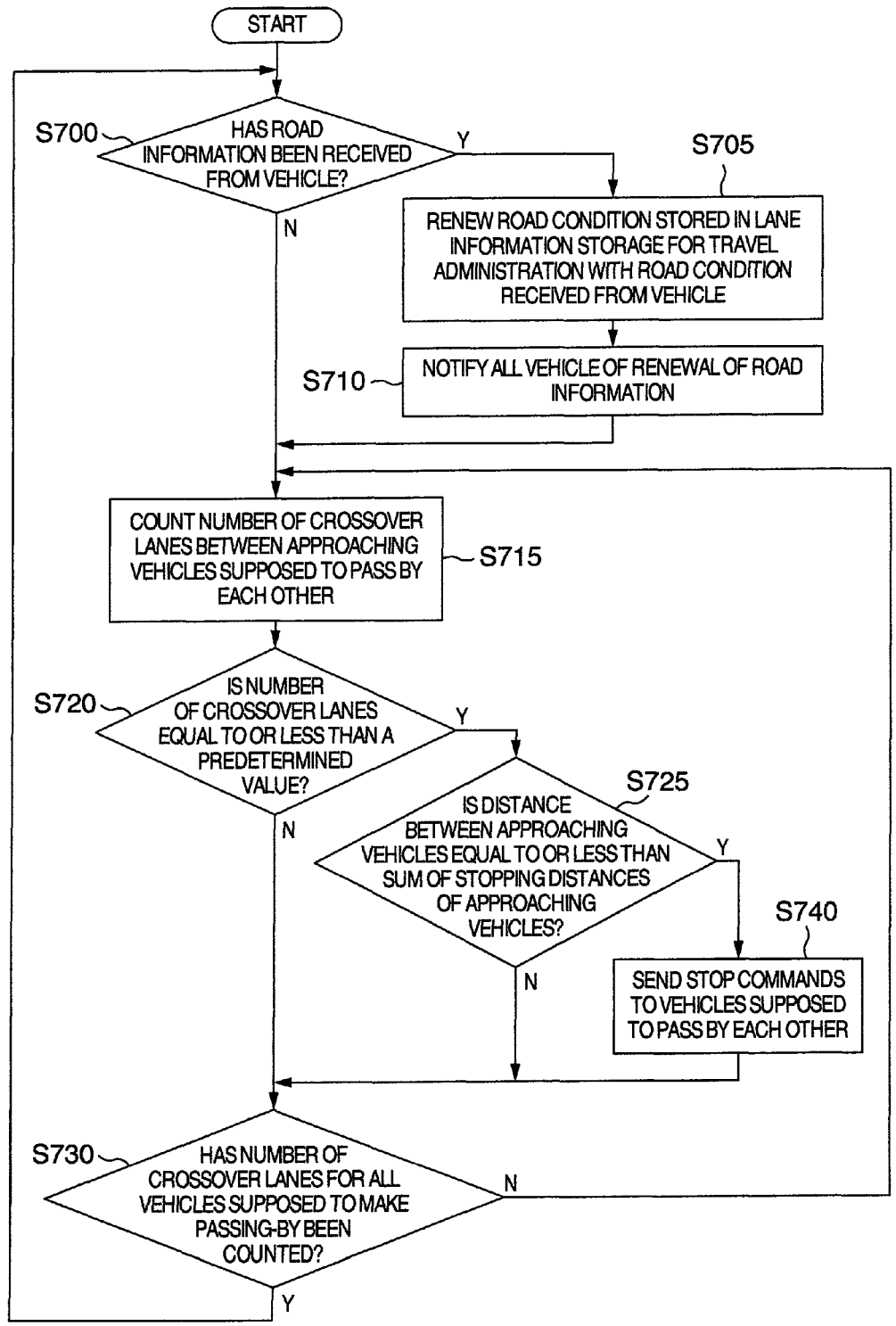
FIG. 7 is the flow chart for a process performed on the side of the travel administration center.

The process performed under the control by the travel administration controller 112 in the travel administration center 102 will now be described in reference to the flow chart shown in FIG. 7.

The travel administration controller 112 makes decision on whether or not it has received from the traveling vehicle the information on the road condition of the crossover lane near the traveling vehicle measured and discriminated by the vehicle, and then the process flow bifurcates depending on the result of the decision (S700). If the road condition has been received from the vehicle, the step S705 is reached since it is considered that the road conditions of some of the crossover lanes have been changed. If the road condition has not been received, the step S715 is reached.

When the road condition, which consists of the parameters representing the link ID of the interested crossover lane and the road condition of the interested crossover lane, has been received from the vehicle, the link ID column 520 of the crossover lane table T2 is searched by using the link ID of the crossover lane received from the vehicle, regarded as a search key. Then, the road condition 535 is renewed by the parameters of the received road condition (S705). Thereafter, the result of the renewal of the road condition is notified to the traveling vehicles listed in the vehicle administration table T4 (S710) and then the step S715 is reached.

In the step S715, the approaching vehicle detector 120 counts the number of crossover lanes whose road conditions are good, existing between two vehicles traveling the independent travel lane toward each other, the two vehicles being supposed to pass by each other on their respective mine-ward and backward pass-by lanes. In order to perform such a counting, the approaching vehicle detector 120 must receive from the approaching vehicles via the transceiver 125 the IDs of the two links of the independent travel lane which are currently being traveled by the vehicles and which are stored in the independent travel lane table T1. By obtaining and counting the IDs of the links of the crossover lanes existing between the two received link IDs of the approaching vehicles and associated with the independent travel lane, the number of the crossover lanes can be counted. In the step S715, decision is made on whether or not the number of the links counted in step S715 is equal to or less than a predetermined value that is chosen according to the safety standard in anticipation of a case where there may be some obstacles on some of the crossover lanes (S720). If the number of the counted links is equal to or less than the predetermined value, the step S725 is reached whereas if the number is greater than the value, the step S730 is reached.

If the number of the links of the crossover lanes for leading to the pass-by lanes, existing between the two traveling vehicles supposed to pass by each other in the future is equal to or less than the predetermined value, the distance between the traveling vehicles is first determined so as to assess the risk of collision between them. In other words, the distance between the approaching vehicles is determined after the vehicles have transmitted to the travel administration center 102 via the transceivers 130 the information on their vehicle positions stored in the vehicle position column 255 of the vehicle position table T5 shown in FIG. 2, in the step S605 in FIG. 6. Then, decision is made on whether or not the determined distance is equal to or less than the sum of the stopping distances of the respective vehicles (S725). It is to be noted here that the stopping distance of a vehicle is meant to be the minimum distance with respect to the vehicle traveling at the maximum speed, from the position of the vehicle at the time of applying the brake to the position at which the vehicle comes to a halt. The stopping distance is previously obtained from, for example, the related vehicle catalog or experiments.

In the step S725 of decision, if the distance between the approaching vehicles is found smaller than the sum of the stopping distances of the respective vehicles, stopping commands are immediately sent to the approaching vehicles supposed to pass by each other in the near future, to stop them (S740) and then the step S730 is reached. On the other hand, If the distance between the approaching vehicles is found greater than the sum of the stopping distances of the respective vehicles, it is considered that the approaching vehicles still have time before they enter the crossover lanes leading to the pass-by lanes so that no stopping commands are sent to the vehicles, and thereafter the step S730 is reached.

In the step S730, decision is made on whether or not the process of counting the number of the links of the crossover lanes existing between any two approaching vehicles and having good road conditions, has covered all the pairs of approaching vehicles traveling the independent travel lane and supposed to pass by each other on the mine-ward pass-by lane and the backward pass-by lane. If the counting process has not yet covered all the pairs of approaching vehicles (S730: N), the process flow returns to the step of counting the number of the links of the crossover lanes whose road conditions are good and which exist between the links of the independent travel lane that are currently being traveled respectively by the two approaching vehicles supposed to pass by each other on the mine-ward pass-by lane and the backward pass-by lane in the future, with respect to the remaining uncovered pairs of approaching vehicles. When all the pairs have been covered by the counting process (S730: Y), the process of causing the approaching vehicles to pass by each other at the particular time finishes. Therefore, the process flow returns to the step S700, and the above described process is repeated at a predetermined interval from the beginning.

By repeating the above described process at a predetermined interval, the information on the change in the road conditions of the crossover lanes collected by a traveling vehicle can be shared among the other vehicles. Accordingly, by simply allowing the travel administration center 102 to send out instructions for passing-by to the two approaching vehicles supposed to pass by each other in the future, these vehicles autonomously find the crossover lanes available and enter the pass-by lanes via the available crossover lanes so that safe passing-by can be secured.

It should further understood by those skilled in the art that although the foregoing description has been made on embodiments of the invention, the invention is not limited thereto and various changes and modifications may be made without departing from the spirit of the invention and the scope of the appended claims.

The invention claimed is:

1. An autonomic traveling apparatus for a vehicle comprising:
  a vehicle position obtaining unit that obtains the current position of a traveling vehicle;
  a lane information storage that stores links of lane traveled by the vehicle;
  a travel controller that causes the vehicle to travel toward end coordinates of the link being currently traveled by the vehicle, the end coordinates being regarded as a destination for the vehicle;
  a transceiver that communicates with a travel administration center;
  an obstacle-on-lane detector that checks the link to determine whether a obstacle exists on the link; and
  a road condition detector that checks a condition of a surface of lanes including crossover lanes near the traveling vehicle and determines that the lane is in a good condition,
  wherein the lane information storage stores coordinates of start and end points of the links representing shapes of lanes with respect to an independent travel lane which vehicles travel at high speeds, pass-by lanes which vehicles travel when the vehicles pass by other vehicles and the crossover lanes which vehicles travel when the vehicles change their course from the independent travel lane to the pass-by lanes, and also stores the road conditions of crossover lanes for each link;
  the transceiver notifies a travel administration center of the road condition of the crossover lanes detected by the road condition detector and a current position of the traveling vehicle, and receives from the travel administration center the result of the measurement of road condition of the crossover lanes;
  when the vehicle receives a command from the travel administration center to enter the pass-by lane, the transceiver receives information on the available crossover lanes with good road condition from the travel administration center and stores the information about the crossover lanes with good road condition into a database of the vehicle; and
  the travel controller causes the vehicle to change its course to the pass-by lane via the crossover lane with good road condition based on stored information in the database after the obstacle-on-lane detector determines that the crossover lane with good road condition is free of an obstacle.

2. The autonomic traveling apparatus for a vehicle as claimed in claim 1, wherein the road condition detector checks the road condition of the crossover lane near the traveling vehicle and determines whether or not the road condition of the crossover lane is good enough to allow the vehicle to transfer to the pass-by lane via the crossover lane.

3. The autonomic traveling apparatus for a vehicle as claimed in claim 1, wherein the travel administration center comprises:
  a transceiver that communicates with the traveling vehicle;
  a lane information storage for travel administration which stores the coordinates of the start and end points of the links representing the shapes of lanes with respect to the independent travel lane which vehicles travel at high speeds, pass-by lanes which vehicles travel when the vehicles pass by other vehicles and crossover lanes which vehicles travel when the vehicles change their course from the independent travel lane to the pass-by lane, and also stores pieces of information corresponding to the road conditions of crossover lanes for each link, the road conditions of the crossover lanes being received from the respective traveling vehicles;
  an approaching vehicle detector that determining the timing of that two vehicles approaching each other change their lane to the respective pass-by lanes;
  a crossover lane searching unit that searches the crossover lanes existing between the approaching vehicles whose change of lane to the pass-by lanes is determined by the approaching vehicle detector; and
  an emergency stop notifying unit that sending an emergency stop command to the approaching vehicles when a distance between the approaching vehicles becomes equal to or less than a sum of the stopping distances of the respective vehicles.

4. The autonomic traveling apparatus for a vehicle as claimed in claim 3, wherein the approaching vehicle detector counts the number of the crossover lane links existing between each of all combinations of approaching autonomic vehicles traveling toward and back to/from a mining site respectively, and finds a particular combination of autonomic vehicles between which the number of the crossover lane links is equal to or less than a value predetermined in accordance with a certain safety standard.

5. The autonomic traveling apparatus for a vehicle as claimed in claim 3, wherein the crossover lane searching unit searches for the crossover lanes exiting between the approaching autonomic vehicles which the approaching vehicle detector has found to transfer to pass-by lanes, and notifies the approaching vehicles of a link ID of the nearest crossover lane.

6. The autonomic traveling apparatus for a vehicle as claimed in claim 3, wherein the emergency stop notifying unit sends out emergency stop commands to the approaching vehicles which continue to approach each other despite the fact that no available crossover lanes are found between them because there are obstacles on all the crossover lanes existing between them and the distance between them became equal to or less than the sum of the stopping distances of the approaching vehicles.

* * * * *